(12) United States Patent
Tian et al.

(10) Patent No.: US 11,627,442 B2
(45) Date of Patent: Apr. 11, 2023

(54) PRIORITIZING DIGITAL ASSISTANT RESPONSES

(71) Applicant: MOTOROLA SOLUTIONS, INC., Chicago, IL (US)

(72) Inventors: Yong Tian, Chengdu (CN); Raguraman Kumaresan, Evanston, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/975,221

(22) PCT Filed: May 25, 2018

(86) PCT No.: PCT/CN2018/088386
§ 371 (c)(1),
(2) Date: Aug. 24, 2020

(87) PCT Pub. No.: WO2019/222994
PCT Pub. Date: Nov. 28, 2019

(65) Prior Publication Data
US 2021/0377704 A1    Dec. 2, 2021

(51) Int. Cl.
| | |
|---|---|
| *H04W 4/38* | (2018.01) |
| *H04W 4/06* | (2009.01) |
| *H04W 84/10* | (2009.01) |
| *H04W 84/18* | (2009.01) |
| *H04W 92/20* | (2009.01) |

(52) U.S. Cl.
CPC ............... *H04W 4/38* (2018.02); *H04W 4/06* (2013.01); *H04W 84/10* (2013.01); *H04W 84/18* (2013.01); *H04W 92/20* (2013.01)

(58) Field of Classification Search
CPC ....... H04W 84/10; H04W 4/38; H04W 84/18; H04W 4/06; H04W 92/20
See application file for complete search history.

(56) References Cited

U.S. PATENT DOCUMENTS

| | | | |
|---|---|---|---|
| 5,483,618 A | 1/1996 | Johnson et al. | |
| 9,172,747 B2 | 10/2015 | Walters et al. | |
| 9,729,592 B2 | 8/2017 | Slayton et al. | |
| 2007/0239824 A1 | 10/2007 | Shaffer et al. | |
| 2007/0297366 A1 | 12/2007 | Osann | |
| 2008/0055113 A1* | 3/2008 | Muro | G06Q 10/00 340/870.16 |
| 2009/0174547 A1* | 7/2009 | Greene | G08B 21/0476 340/539.13 |
| 2010/0137015 A1* | 6/2010 | Blanco | H04W 84/08 455/518 |

(Continued)

FOREIGN PATENT DOCUMENTS

CN        102710597 A      10/2012

*Primary Examiner* — Margaret G Mastrodonato

(57) ABSTRACT

A method and apparatus for prioritizing a digital-assistant response is provided herein. During operation a personal-area network (PAN) master device will have knowledge of a status of devices forming the PAN and/or have knowledge of a current incident type assigned to a user. The PAN master device will then prioritize any responses/suggestions to the user based on the status of associated PAN devices and/or the incident type.

20 Claims, 4 Drawing Sheets

(56) References Cited

U.S. PATENT DOCUMENTS

| | | | |
|---|---|---|---|
| 2014/0074483 A1* | 3/2014 | van Os | G06F 3/167 |
| | | | 704/275 |
| 2016/0173832 A1* | 6/2016 | Stewart | F41A 17/20 |
| | | | 348/158 |
| 2016/0307284 A1* | 10/2016 | Parsons | H04L 51/52 |
| 2017/0059350 A1 | 3/2017 | Thirumale | |
| 2020/0128212 A1* | 4/2020 | Sannala | H04L 12/282 |

* cited by examiner

400

| VIRTUAL PARTNER | PRIORITY |
|---|---|
| POLICE RADIO | 9 |
| CAR | 8 |
| PERSONAL PHONE | 4 |
| FITBIT | 2 |
| --- | --- |

PRIORITIZING DIGITAL ASSISTANT RESPONSES

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) and/or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, instructing users how to proceed with an assigned task, warning users of nearby dangers such as traffic accidents or environmental hazards, and providing many other types of information in a reactive or proactive manner.

There can be multiple Virtual Partners (VP) coexisting on different devices in the same personal-area network (PAN) or vehicle-area network (VAN). A user may use them for different functionalities. For example, an officer may use a virtual partner on a radio for criminal related information queries, use virtual partner on a smart phone for general queries, use a virtual partner in a vehicle for navigation, . . . , etc.

As the virtual partners normally use voice to communicate with the end user, the confliction that multiple virtual partners want to talk simultaneously is inevitable. There is need to solve this problem.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for prioritizing a digital-assistant response is provided herein. During operation a personal-area network (PAN) master device will have knowledge of a status of devices forming the PAN and/or have knowledge of a current incident type assigned to a user. The PAN master device will then prioritize any responses/suggestions to the user based on the status of associated PAN devices and/or the incident type.

Expanding on the above, a digital assistant priority for responses will be adjusted based on the fact that a public-safety event has occurred. As discussed, the public-safety event may comprise a current incident assigned to a user, or a status of at least one device connected to form a PAN.

Figure 1:
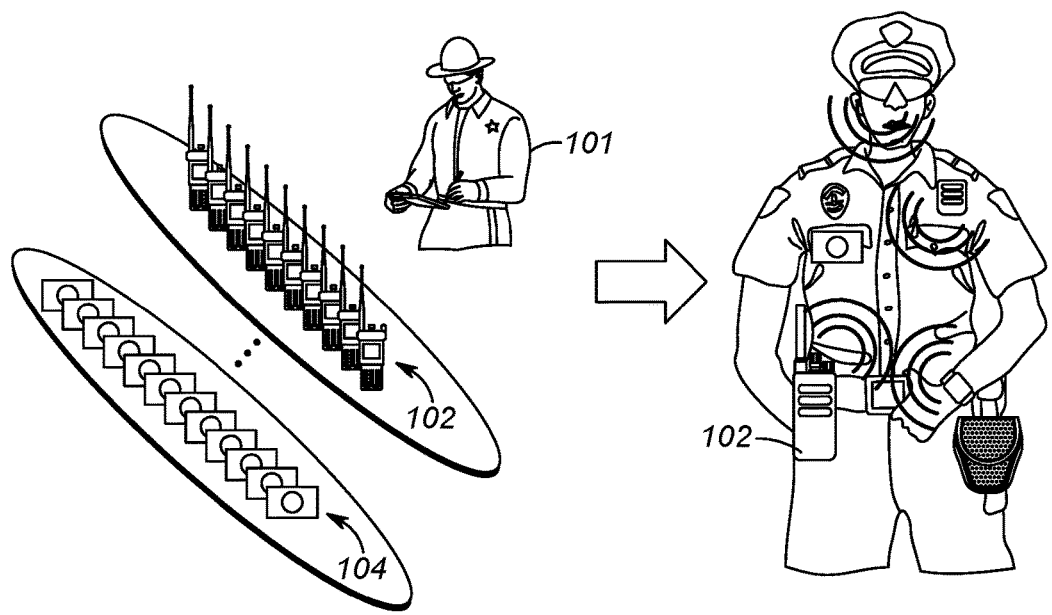
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer may select some of the devices off the shelf, and form a personal area network (PAN) with the devices that will accompany the officer on his shift. For example, the officer may acquire a gun-draw sensor, a body-worn camera, a wireless microphone, a smart watch, a police radio, smart handcuffs, a man-down sensor, a bio-sensor, . . . , etc. All devices acquired by the officer will be configured to form a PAN by associating (pairing) with each other and communicating wirelessly among the devices. At least one device may be configured with a virtual partner. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may acquire one radio 102 and one camera 104 for use during their shift. Other devices may be acquired as well. As shown in FIG. 1, officer 101 will preferably wear the devices during a shift by attaching the devices to clothing. These devices will form a PAN throughout the officer's shift.

Figure 2:
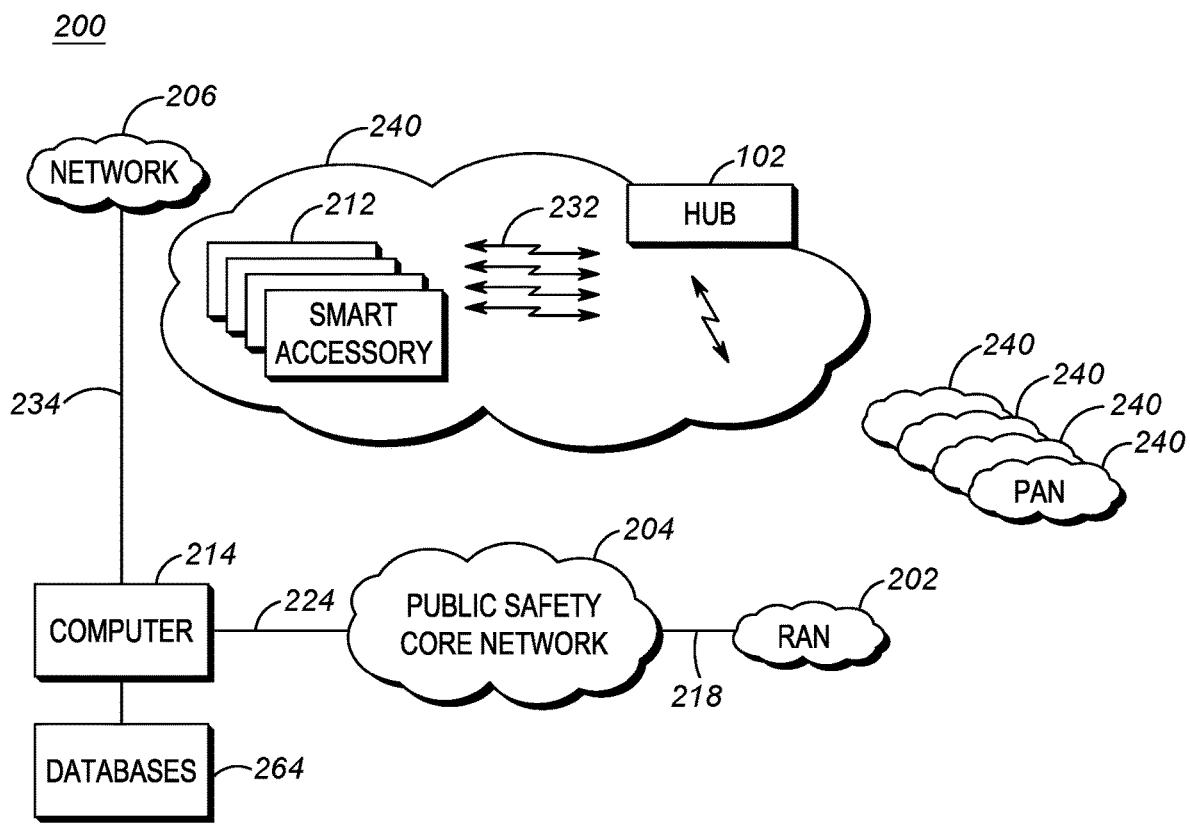
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, high-speed data network 206, hub (PAN master device) 102, local devices (slave devices that serve as smart accessories/sensors) 212, computer 214, databases 264, and communication links 218, 224, 232, and 234. In a preferred embodiment of the present invention, hub 102 and devices 212 form PAN 240, with communication links 232 between devices 212 and hub 102 taking place utilizing a short-range wireless communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards.

High-speed data network 206 is provided. Network 206 may comprise a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, network 206 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Sensor 212 data (which may include video) shared among officers (and reported to dispatch center 214) is typically (but not necessarily) accomplished by utilizing network 206, capable of achieving large data rates, while voice communications take place through network 204. Thus, voice communications among public-safety officers typically take place through one network, while data shared among public-safety officers typically take place through another network.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Hub 102 serves as a PAN master device, and may be any suitable computing and communication device configured to engage in wireless communication with RAN 202 and/or network 206 over the air interface as is known to those in the relevant art. Moreover, one or more hubs 102 are further configured to engage in wired and/or wireless communication with one or more local device 212 via the communication link 232. Hub 102 will be configured to determine when to forward information received from PAN devices 212 to, for example, dispatch center 214. The information can be forwarded to the dispatch center via RANs 202 and/or network 206 based on a combination of device 212 inputs. In one embodiment, all information received from sensors 212 will be forwarded to center 214 via RAN 202 or network 206. In another embodiment, hub 102 will filter the information sent, and only send high-priority information back to dispatch center 214.

It should also be noted that any one or more of the communication links 218, 224, 232, 234 could include one or more wireless-communication links and/or one or more wired-communication links.

Devices 212 and hub 102 may comprise any device capable of forming a PAN. For example, devices 212 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc. Some examples follow:

A sensor-enabled holster 212 may be provided that maintains and/or provides state information regarding a weapon or other item normally disposed within the user's sensor-enabled holster 212. The sensor-enabled holster 212 may detect a change in state (presence to absence) and/or an action (removal) relative to the weapon normally disposed within the sensor-enabled holster 212. The detected change in state and/or action may be reported to the portable radio 102 via its short-range transceiver. In some embodiments, the sensor-enabled holster may also detect whether the first responder's hand is resting on the weapon even if it has not yet been removed from the holster and provide such information to portable radio 102. Other possibilities exist as well.

A biometric sensor 212 (e.g., a biometric wristband) may be provided for tracking an activity of the user or a health status of the user 101, and may include one or more movement sensors (such as an accelerometer, magnetometer, and/or gyroscope) that may periodically or intermittently provide to the portable radio 102 indications of orientation, direction, steps, acceleration, and/or speed, and indications of health such as one or more of a captured heart rate, a captured breathing rate, and a captured body temperature of the user 101, perhaps accompanying other information.

An accelerometer 212 may be provided to measures acceleration. Single and multi-axis models are available to detect magnitude and direction of the acceleration as a vector quantity, and may be used to sense orientation, acceleration, vibration shock, and falling. The accelerometer 212 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 212 may be provided and use electrical contacts with the skin to monitor an electrocardiography (EKG) signal of its wearer, or may use infrared light and imaging device to optically detect a pulse rate of its wearer, among other possibilities.

A breathing rate sensor 212 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor 212 may be provided, and includes an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities. Temperature sensor 212 may be used on equipment to determine if the equipment is being worn or not. For example, temperature sensor 212 may exist interior to a bullet-proof vest. I the temperature sensor 212 senses a temperature above a predetermined threshold (e.g., 80 degrees), it may be assumed that the vest is being worn by an officer.

Database(s) 264 may be accessible via the network 206 and/or the public safety core network 204. In some embodiments, the databases 264 are commercial cloud-based storage devices. In some embodiments, the databases 264 are housed on suitable on-premises database servers. The database(s) 264 may include incident database including data such as incident assignments to officers, user equipment, for example, information related to radios and other PAN devices assigned to officers, and timeline of incidents, or other types of databases such as a long-term video storage database, a historical or forecasted weather database, an offender database perhaps including facial recognition images to match against, a cartographic database of streets and elevations, a traffic database of historical or current traffic conditions, and other sensor data.

Figures 3, 4:
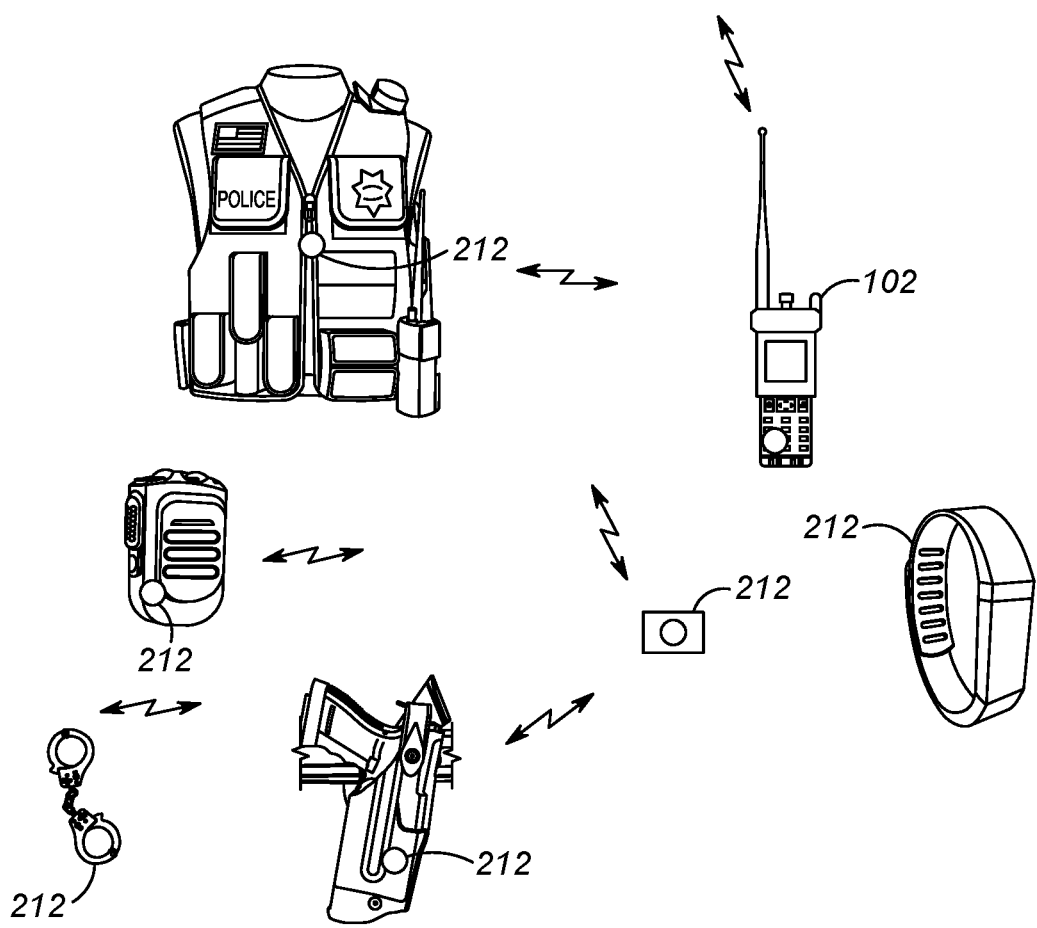
FIG. 3 is a more-detailed view of a personal-area network of FIG. 2.
FIG. 4 illustrates a table showing digital-assistant priority.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, a smart watch 212 is provided to monitor various biological parameters (e.g., heartrate, blood pressure, . . . , etc.) and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and/or forwards local status alert messages describing each sensor state/trigger event over a wide-area network (e.g., RAN/Core Network) to computer 214. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor data via a first network (e.g., Bluetooth PAN network), and forwards the information to computer 214 via a second network (e.g., a public safety wide area network (WAN) or a high-speed data network (WAN)).

As described above, when multiple digital assistants are present, there may be situations where the digital assistants talk over each other. In order to address this issue, all digital assistant responses (whether the digital assistants are located within slave PAN members 212 or hub 102) will have their responses prioritized (i.e., digital assistants will talk in a particular order when multiple devices need to output voice) based on public-safety events. These events may include the status of sensors 212, processed sensor data, and/or an incident type currently assigned to an officer.

As described above, a master device may prioritize digital-assistant output from multiple devices based on a status of sensors 212 that form a PAN with an officer. For example, if dispatch center 214, or hub 102 detects that Officer Smith has drawn his gun, public-safety-related digital assistants (e.g., a digital assistant on a police radio) will receive priority after the gun has been drawn. In a similar manner, when an officer is off duty, personal-related digital assistants (e.g., a user's private smart phone) will receive priority. Expanding on the above, suppose Officer Smith has drawn his gun and both his personal smart phone and his police radio comprise digital assistants that wish to communicate information at a same time. Since the gun has been drawn, the police radio will have its information communicated prior to the smart phone. Alternatively, if Officer Smith is off duty, the smart phone will have its information communicated via its digital assistant prior to the police radio.

As described above, the digital assistant may also be prioritized based on an officer's assignment to a particular incident. So, for example, an officer assigned a first CAD ID by computer 214 will have a first prioritization for all the digital assistants associated with the first officer, and an officer assigned a second CAD ID by computer 214, will have a second prioritization for all the digital assistants associated with a second officer.

Expanding on the above, assume a dispatch operator receives an emergency call (e.g., 911 call) reporting a burglary in progress. The operator instructs computer to assign this incident to Officer Fred. Officer Fred is assigned a CAD ID corresponding to a burglary in progress. Because of this, all public-safety related equipment having digital assistants will be prioritized over non-public safety equipment having digital assistants.

In accordance with some embodiments, the master device may adjust the priority of digital assistants based on whether a PAN member device is expected to leave (i.e., be disconnected from) the PAN. In other words, the master device detects a condition from sensor data that a PAN device associated with one or more of the plurality of digital assistants is expected to leave a PAN and further determines the digital-assistant priority for each of the plurality of digital assistants based on the detected condition. Assume a scenario when an officer assigned to an incident arrives at the location of an incident scene and is expected to soon exit the vehicle. The master device may detect that the officer has arrived at the incident scene by comparing a current location of the vehicle with location of the incident scene. At the same time, prior to the officer exiting the vehicle, the master device receives simultaneous communication requests from a first digital assistant implemented at a vehicular computer (or vehicular radio) of officer's vehicle and a second digital assistant implemented at a mobile radio carried or held by the officer. In response to simultaneous communication requests from digital assistants implemented at two spatially separated devices, the master device may prioritize the communication request received from the first digital assistant at the vehicular computer over the communication request received from the second digital assistant at the mobile radio based on a detected condition that the officer has arrived at the incident scene and may soon exit the vehicle. In other words, in this case, the master device detects that the vehicular computer is expected to leave the officer's PAN (based on the vehicle arriving at the location of the incident scene) and accordingly raises the priority associated with a communication request received from the first digital-assistant at the vehicular computer. This ensures that the officer is able to listen to the communication generated by the first digital assistant associated with the vehicular computer prior to exiting the vehicle.

Alternatively, if simultaneous communication requests from the first and second digital assistants (i.e., at the vehicular computer and mobile radio, respectively) are received at the master device in response to a detected condition that the officer has exited the vehicle after arriving at the incident scene, the master device may prioritize the communication request from the second digital assistant at the mobile radio over the communication request from the first digital assistant at the vehicular computer. This is because the master device detects that the officer has exited the vehicle (for example, from sensor data) and no longer available to receive or listen to a response associated with the communication request received from the first digital assistant at the vehicular computer. In other words, in this particular situation, the master device detects that the vehicular computer is expected to leave the officer's PAN (for example, based on sensor data that the officer is no longer in proximity to the vehicle or has exited the vehicle) and accordingly lowers the priority associated with a communication request received from vehicular computer. Accordingly, the master device adjusts (i.e., lowers or raises) the digital-assistant priority based on a condition detected from the sensor data that indicates that one or more PAN member devices (associated with respective digital assistants) are expected to leave the PAN within a given period of time.

In order to accomplish the above, all devices 212 are connected via Bluetooth technology in an ad hoc fashion forming a piconet (i.e,. a short-range PAN). In a piconet, there is one master device and one or more slave devices. The number of slave devices is limited by the capability of the master device. All communication within a piconet is between the master and slave devices. There is no direct communication between the slave devices over a piconet, although these devices may have separate Bluetooth connections between them not using the piconet.

After a piconet is established, the slave devices are synchronized to the timing and frequencies specified by the master device. Note that in a piconet, each slave device uses a different physical channel. Thus, a piconet starts with two connected devices, and may grow to any number of connected devices (although in some systems eight is the maximum number of devices within a Bluetooth piconet). Bluetooth communication always designates one of the Bluetooth devices as a main controlling unit or master unit.

Other devices that follow the master unit are slave units. This allows the Bluetooth system to be non-contention based (no collisions). This means that after a Bluetooth device has been added to the piconet, each device is assigned a specific time period to transmit and they do not collide or overlap with other units operating within the same piconet.

In the present invention, the master Bluetooth device contains a "priority" list of digital assistants existing on at least devices 212. For example, a police radio digital assistant may have a highest priority while a digital assistant existing on a personal phone may have a lesser-priority, and digital assistant on a heart-rate monitor may have a lowest-priority.

Whenever a digital assistant on a device 212 wishes to communicate (i.e., speak), it will notify master device 102 via standard Bluetooth messaging. Master device 102 will then grant permission to do so. When multiple devices 212 request to communicate simultaneously (i.e., at a same time), master device 102 will receive multiple simultaneous requests, but only grant permission to the device with a higher priority. When devices are finished communicating, they will again notify master device 102, and master device 102 may then grant a lower-priority device permission to communicate.

As discussed above, the priority of devices may change based on conditions. Regardless of whether or not the above functionality exists within hub 102 or any other device, logic circuitry will map a priority of a digital assistant to sensor status and/or incident type. The mapping process preferably comprises an operation that associates each element of a given set (the domain) with one or more elements of a second set (the range). The public-safety event (e.g., PAN sensor statuses and/or the CAD ID) for a user comprises the domain, while the priority of a device comprises the range. For example, y=F(x), where y is the range and x is the domain. If y is the priority (range) and public-safety event comprises the domain, then:

Priority for a device=Function(public-safety event).

The mapping may be explicit based on predefined rules, or the mapping may be trained via neural network modeling. The priority level (i.e., the range) may comprise a numerical value, for example, a number between 0 and 9.

A memory existing in hub 102 will store various sensor data generated by devices 212 along with possible assignment ID (CAD_ID) and will generate a priority list. Such a list is illustrated in FIG. 4. As shown in FIG. 4, and described above a memory comprises a table 400 having device priority. The priority list 400 preferably comprises a list of devices and their digital-assistant priority to speak.

Figure 5:
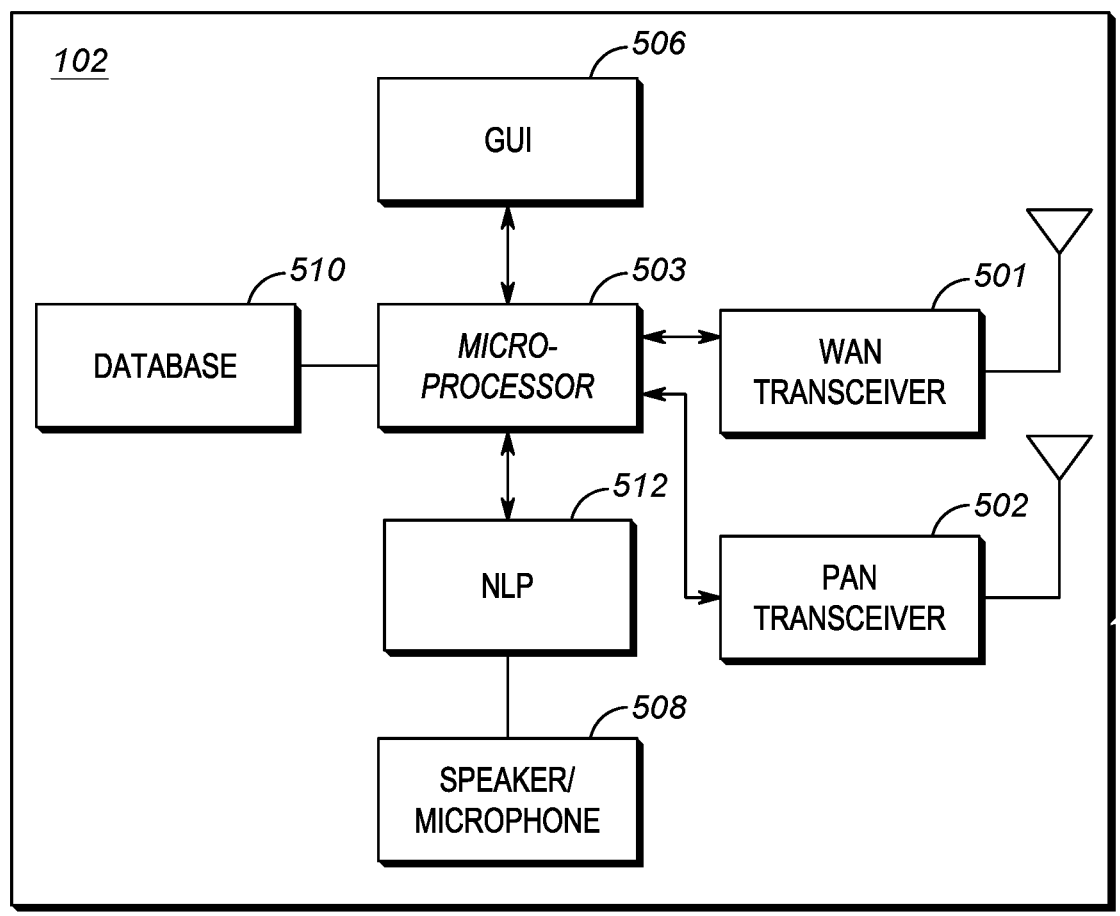
FIG. 5 is a block diagram of a hub.

With the above examples in mind, FIG. 5 sets forth a schematic diagram that illustrates a device 102 to determine a public-safety event (e.g., a status of devices/equipment and/or an incident assigned to an officer), and prioritize responses from multiple digital assistants accordingly. In an embodiment, the device is embodied within hub 102, however in alternate embodiments the device may be embodied within the public-safety core network 204, or more computing devices in a cloud compute cluster (not shown), or some other communication device not illustrated in FIG. 2, and/or may be a distributed communication device across two or more entities. In this particular embodiment, device 102 may receive multiple requests to speak from multiple digital assistants, and prioritize them as described above.

FIG. 5 shows those components (not all necessary) for device 102 to determine what equipment is present, determine a status of the equipment present, determine an incident assigned to an officer, and to prioritize any virtual partners for devices 212 accordingly. As shown, hub 102 includes a wide-area-network (WAN) transceiver 501 (e.g., a transceiver that utilizes a public-safety communication-system protocol), PAN transceiver 502 (e.g., a short-range transceiver), Graphical User Interface (GUI) 506, database 510, logic circuitry 503, speaker 508 and NLP 512. In other implementations, hub 102 may include more, fewer, or different components.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network. WAN transceiver 501 provides sensor status updates to dispatch center 214.

PAN transceiver 502 may be well known short-range (e.g., 30 feet of range) transceivers that utilize any number of network system protocols. For example, PAN transceiver 502 may be configured to utilize Bluetooth communication system protocol for a body-area network, or a private 802.11 network. PAN transceiver forms the PAN (acting as a master device) with various sensors 212.

GUI 506 comprises provides a way of displaying information and receiving an input from a user. For example, GUI 506 may provide a way of conveying (e.g., displaying) information to a user regarding that status of devices 212.

Speaker/microphone 508 provides a mechanism for receiving human voice and providing it to the digital assistant (e.g., logic circuitry 503/NLP 512), along with providing audible information generated by the digital assistant (e.g., a voice). Speaker/microphone 508 may receive queries from a user and provide the queries to logic circuitry 503, acting as a digital assistant.

Logic circuitry 503 comprises a digital signal processor (DSP), general purpose microprocessor, a programmable logic device, or application specific integrated circuit (ASIC) and is configured to prioritize digital assistants embodied within devices 212.

Database 510 is provided. Database 510 comprises standard memory (such as RAM, ROM, . . . , etc) and serves to store digital assistant PAN member names (identifications), sensor statuses, and any incident assigned to hub 102, and a priority for each digital assistant present as part of the PAN (as shown in the table of FIG. 3). So, for example, database 510 may comprise a list of PAN member digital assistants (radio, personal phone, automobile, fitness tracker, . . . , etc.) that formed a PAN with hub 102. Database 510 also stores status information for each sensor (e.g., long gun in use, bullet-proof vest being worn, dun-draw sensor indicating a gun is holstered, . . . , etc.).

NLP 12 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

During operation the apparatus shown in FIG. 5 comprises a wide-area network transceiver configured to receive an incident type assigned to a public-safety officer. A personal-area-network (PAN) transceiver is configured to communicate with a plurality of digital assistants, and logic circuitry is configured to map the incident type to a digital-assistant priority for each of the plurality of digital assistants.

As discussed above, the PAN transceiver is configured to receive multiple simultaneous requests to communicate from at least two digital assistants. The logic circuitry is configured to determine a digital-assistant priority for each of the at least two digital assistants and instruct the PAN transceiver to grant the digital assistant with a highest-priority permission to communicate.

The granting of permission comprises sending a message (data) to the digital assistant via standard Bluetooth messaging indicating permission has been granted. More particularly, as discussed above, every digital assistant that wishes to communicate will send a request for communication via standard Bluetooth messaging to the PAN master device. Once received, PAN master device will message back indicating that it is OK to communicate. Communication by a digital assistant will not take place unless permission is granted by the hub. Typically, permission is always granted unless a conflict occurs. When this happens, the logic circuitry is configured to give permission to the highest-priority digital assistant.

Logic circuitry is also configured to determine that the highest-priority digital assistant has finished communicating, and then instruct the PAN transceiver to grant a lower-priority digital assistant permission to communicate. More particularly, digital assistants will send a "communication finished" message to the PAN master device indicating that the digital assistant is finished communicating. Once this happens, PAN master device is free to again grant permission to communicate to other digital assistants.

Thus, the PAN master device will receive a message from any digital assistant wishing to communicate. The digital assistants are all part of the PAN. Each device of the PAN may comprise its own unique digital assistant. The PAN master device will grant permission to communicate by sending another message to any device it has granted permission to communicate. Once the digital assistant is finished communicating, the digital assistant will notify the PAN master device of this fact by messaging the PAN master device with a message indicating that the digital assistant is finished with its communication.

In addition to the above, the PAN transceiver is configured to receive a plurality of sensor data from a plurality of sensors. The logic circuitry is configured to additionally map the sensor data to the digital-assistant priority for each of the plurality of digital assistants. Thus, in one embodiment of the present invention both sensor data and assignment ID (CAD_ID) are utilized to determine a priority.

In an alternate embodiment of the present invention, only sensor data is utilized to map digital assistants to with a priority. In this case, the PAN master device will comprise a personal-area-network (PAN) transceiver configured to communicate with a plurality of digital assistants and communicate with a plurality of sensors to receive sensor data from a plurality of sensors. Logic circuitry will be configured to map the sensor data to a digital-assistant priority for each of the plurality of digital assistants.

Figure 6:
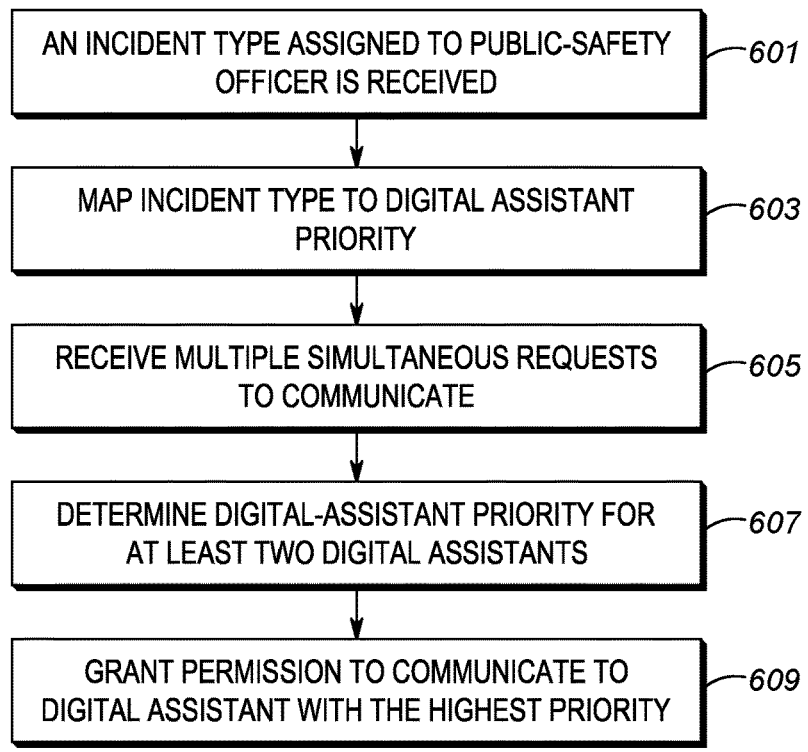
FIG. 6 is a flow chart for determining a digital-assistant priority.

FIG. 6 is a flow chart for determining a digital-assistant priority. Not all steps are necessary to practice the invention. The logic flow begins at step 601 where WAN transceiver 501 receives an incident type assigned to a public-safety officer. Preferably, the incident assignment comes from dispatch center 214. At step 603 WAN transceiver passes the assignment to logic circuitry 503 which maps the incident type to a digital-assistant priority for each of a plurality of digital assistants. As discussed, each digital assistant from the plurality of digital assistants is separated spatially from each other and exist on a separate device.

The logic flow continues to step 605 where PAN transceiver receives multiple simultaneous (simultaneous in time, or temporally simultaneous) requests to communicate by at least two digital assistants. At step 607 logic circuitry determines a digital-assistant priority for each of the at least two digital assistants. This is accomplished by accessing the table shown in FIG. 3, stored in database 510. More particularly, the table in FIG. 3 is re-written each time a new assignment is received. The rewriting is preferably based on pre-defined rules (e.g., when assigned to a robbery in progress, assign various digital assistants particular priorities, . . . , etc.). Finally, at step 609 a digital assistant with a highest priority is granted permission to communicate by instructing PAN transceiver to send an appropriate message to the highest-priority digital assistant.

The table in FIG. 3 can also be re-written based on received sensor data so that digital-assistant priorities change when various sensors are triggered. For example, if a gun-draw sensor indicates that a gun has been drawn, priorities for all digital assistants in the PAN may be re-written so that, for example, the police radio may receive a highest priority and a personal phone may receive a lowest priority. The table may be re-written based on both CAD_ID and sensor data. When this is the case, PAN transceiver 502 will receive a plurality of sensor data from a plurality of sensors; and the step of mapping comprises additionally mapping the sensor data to the digital-assistant priority.

Figure 7:
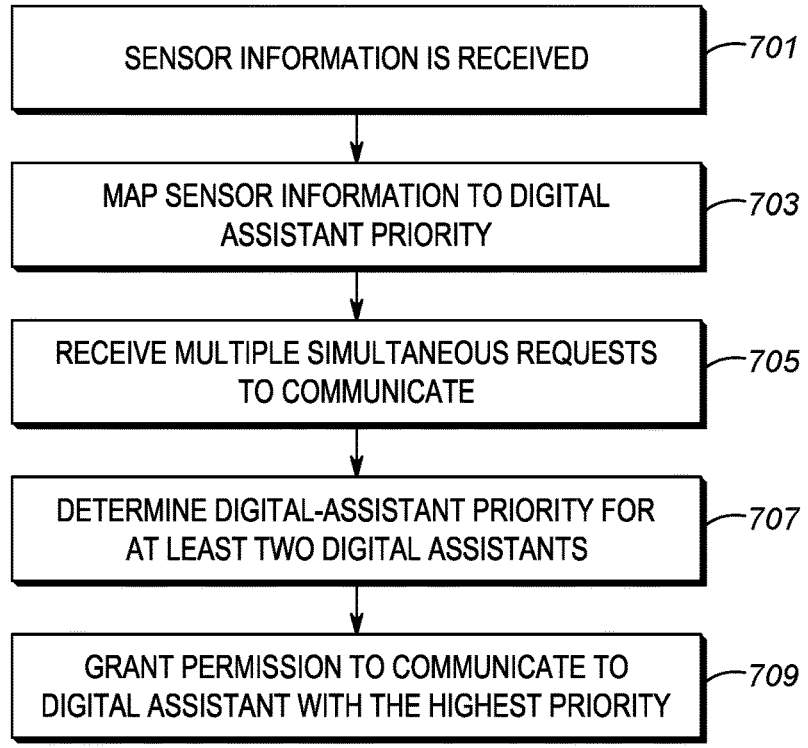
FIG. 7 is a flow chart for determining a digital-assistant priority.

FIG. 7 is a flow chart for determining a digital-assistant priority. Not all steps are necessary to practice the invention. The logic flow begins at step 701 where PAN transceiver 501 receives sensor information. At step 703 PAN transceiver passes the sensor information to logic circuitry 503 which maps the sensor information to a digital-assistant priority for each of a plurality of digital assistants. As discussed, each digital assistant from the plurality of digital assistants is separated spatially from each other and exist on a separate device.

The logic flow continues to step 705 where PAN transceiver receives multiple simultaneous (simultaneous in time, or temporally simultaneous) requests to communicate by at least two digital assistants. At step 707 logic circuitry determines a digital-assistant priority for each of the at least two digital assistants. This is accomplished by accessing the table shown in FIG. 3, stored in database 510. More particularly, the table in FIG. 3 is re-written each time a new assignment is received. The rewriting is preferably based on pre-defined rules. Finally, at step 709 a digital assistant with a highest priority is granted permission to communicate by instructing PAN transceiver to send an appropriate message to the highest-priority digital assistant.

In the foregoing specification, specific embodiments have been described. However, one of ordinary skill in the art appreciates that various modifications and changes can be made without departing from the scope of the invention as set forth in the claims below. For example, while the above discussion was applied mainly to PANs, one of ordinary skill in the art will recognize that the above solution can be applied to any network, including VANS, or a combination of networks PANs and VANs. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a wide-area network transceiver configured to receive an incident type of a public-safety incident assigned to a public-safety officer;
   a personal-area-network (PAN) transceiver configured to communicate with a plurality of digital assistants, each digital assistant from the plurality of digital assistants is separated spatially from each other and exist on a separate device, the PAN transceiver configured to grant permission to only one of the digital assistants to communicate at a time; and
   logic circuitry configured to map the incident type to a digital-assistant priority for each of the plurality of digital assistants, wherein
   the PAN transceiver is configured to receive multiple simultaneous requests to communicate from at least two digital assistants separated spatially from each other; and
   the logic circuitry is configured to determine a digital-assistant priority for each of the at least two digital assistants and instruct the PAN transceiver to grant a highest-priority digital assistant permission to communicate.

2. The apparatus of claim 1 wherein:
   the logic circuitry is configured to determine that the highest-priority digital assistant has finished communicating, and then instruct the PAN transceiver to grant a lower-priority digital assistant permission to communicate.

3. The apparatus of claim 1 wherein the PAN transceiver is configured to receive a plurality of sensor data from a plurality of sensors.

4. The apparatus of claim 3 wherein the logic circuitry is configured to additionally map the sensor data to the digital-assistant priority for each of the plurality of digital assistants.

5. The apparatus of claim 3, wherein:
the logic circuitry is configured to detect a condition from the sensor data that a PAN device associated with one of the plurality of digital assistants is expected to leave a PAN and determine the digital-assistant priority for each of the plurality of digital assistants based on the detected condition.

6. The apparatus of claim 1, wherein the logic circuitry is configured to:
receive a message from the highest-priority digital assistant, the message indicating that the highest-priority digital assistant has finished communicating;
determine, from the message, that the highest-priority digital assistant has finished communicating; and
instruct the PAN transceiver to grant a lower-priority digital assistant permission to communicate.

7. The apparatus of claim 1, wherein the multiple simultaneous requests to communicate by the at least two digital assistants is received at the PAN transceiver in response to a query received at the at least two digital assistants from the public-safety officer.

8. An apparatus comprising:
a personal-area-network (PAN) transceiver configured to communicate with a plurality of digital assistants and communicate with a plurality of sensors to receive sensor data from a plurality of sensors, each digital assistant from the plurality of digital assistants is separated spatially from each other and exist on a separate device, the PAN transceiver configured to grant permission to only one of the digital assistants to communicate at a time;
logic circuitry configured to map the sensor data to a digital-assistant priority for each of the plurality of digital assistants, wherein
the PAN transceiver is configured to receive multiple simultaneous requests to communicate by at least two digital assistants separated spatially from each other; and
the logic circuitry is configured to determine a digital-assistant priority for each of the at least two digital assistants and instruct the PAN transceiver to grant the digital assistant with a highest-priority permission to communicate.

9. The apparatus of claim 8 wherein:
the logic circuitry is configured to determine that a highest-priority digital assistant has finished communicating, and then instruct the PAN transceiver to grant a lower-priority digital assistant permission to communicate.

10. The apparatus of claim 8, wherein:
the logic circuitry is configured to detect a condition from the sensor data that a PAN device associated with one of the plurality of digital assistants is expected to leave a PAN and determine the digital-assistant priority for each of the plurality of digital assistants based on the detected condition.

11. The apparatus of claim 8, further comprising a wide-area network (WAN) transceiver configured to receive an incident type assigned to a public-safety officer.

12. The apparatus of claim 8, wherein the logic circuitry is configured to:
receive a message from the highest-priority digital assistant, the message indicating that the highest-priority digital assistant has finished communicating;
determine, from the message, that the highest-priority digital assistant has finished communicating; and
instruct the PAN transceiver to grant a lower-priority digital assistant permission to communicate.

13. The apparatus of claim 8, wherein the multiple simultaneous requests to communicate by the at least two digital assistants is received at the PAN transceiver in response to a query received at the at least two digital assistants from the public-safety officer.

14. A method comprising the steps of:
receiving an incident type of a public-safety incident assigned to a public-safety officer; and
mapping the incident type to a digital-assistant priority for each of a plurality of digital assistants, each digital assistant from the plurality of digital assistants is separated spatially from each other and exist on a separate device; and
receiving multiple simultaneous requests to communicate by at least two digital assistants separated spatially from each other;
determining that only one of the two digital assistants can be granted permission to communicate at a time;
determining a digital-assistant priority for each of the at least two digital assistants; and
granting a digital assistant with a highest priority permission to communicate.

15. The method of claim 14 further comprising the step of:
receiving a plurality of sensor data from a plurality of sensors; and
wherein the step of mapping comprises additionally mapping the sensor data to the digital-assistant priority.

16. The method of claim 15, further comprising:
detecting a condition from the sensor data that a PAN device associated with one of the plurality of digital assistants is expected to leave a PAN; and
determining the digital-assistant priority for each of the plurality of digital assistants based on the detected condition.

17. The method of claim 15, wherein the at least two digital assistants include a first digital assistant implemented on a vehicular computer of a vehicle associated with the public-safety officer and a second digital assistant implemented on a mobile radio associated with the public-safety officer, the method further comprising:
detecting a condition from the sensor data that the public-safety officer has exited the vehicle after arriving at an incident scene associated with the public-safety incident;
receiving, upon detecting the condition, multiple simultaneous requests including a first communication request to communicate by the first digital assistant implemented on the vehicular computer and a second communication request to communicate by the second digital assistant implemented on the mobile radio; and
responsively prioritizing, based on the detected condition, the second communication request by the second digital assistant implemented on the mobile radio over the first communication request by the first digital assistant implemented on the vehicular computer.

18. The method of claim 15, wherein the at least two digital assistants include a first digital assistant implemented on a vehicular computer of a vehicle associated with the public-safety officer and a second digital assistant implemented on a mobile radio associated with the public-safety officer, the method further comprising:
detecting a condition from the sensor data that the public-safety officer has not yet exited the vehicle after arriving at an incident scene associated with the public-safety incident;

receiving, upon detecting the condition, multiple simultaneous requests including a first communication request to communicate by the first digital assistant implemented on the vehicular computer and a second communication request to communicate by the second digital assistant implemented on the mobile radio; and responsively prioritizing, based on the detected condition, the first communication request by the first digital assistant implemented on the vehicular computer over the second communication request by the second digital assistant implemented on the mobile radio.

19. The method of claim 14, further comprising:

receiving a message from the digital assistant with the highest priority, the message indicating that the digital assistant with the highest priority has finished communicating;

determine, from the message, that the digital assistant with the highest priority has finished communicating; and granting a digital assistant with a lower priority permission to communicate.

20. A method comprising the steps of:

receiving assignment of a public-safety incident by a dispatch computer to a public-safety officer;

assigning, based on the assignment of the public-safety incident to the public-safety officer, a first digital-assistant priority to a first digital assistant implemented on a public-safety related equipment associated with the public-safety officer and a second digital-assistant priority to a second digital assistant implemented on a non-public safety related equipment associated with the public-safety officer, wherein the first digital-assistant priority is higher than the second digital-assistant priority;

receiving multiple simultaneous requests including a first communication request to communicate by a first digital assistant implemented on the public-safety related equipment and a second communication request to communicate by a second digital assistant implemented on the non-public safety related equipment; and determining that the first digital-assistant priority assigned to the first digital assistant implemented on the public-safety related equipment is higher than the second digital-assistant priority assigned to the second digital assistant implemented on the non-public safety related equipment, and responsively prioritizing the first communication request by the first digital assistant implemented on the public-safety related equipment over the second communication request by the second digital assistant implemented on the non-public safety related equipment.

* * * * *